United States Patent

Fisher et al.

[15] 3,648,259

[45] Mar. 7, 1972

[54] PLATED WIRE MEMORY

[72] Inventors: Robert D. Fisher; Ernest W. Jones, both of Woodstock, N.Y.

[73] Assignee: Ferroxcube Corporation, Saugerties, N.Y.

[22] Filed: June 22, 1970

[21] Appl. No.: 48,158

[52] U.S. Cl. ...........340/174 PW, 340/174 BA, 340/174 DA, 340/174 GP, 340/174 VA, 340/174 WC

[51] Int. Cl. ..................G11c 5/04, G11c 11/04, G11c 11/14

[58] Field of Search ..........................................340/174 PW

[56] References Cited

UNITED STATES PATENTS 3,500,353 3/1970 Tohma et al. ...................340/174 PW 3,488,642 1/1970 Maeda ...........................340/174 PW

*Primary Examiner*—James W. Moffitt

*Attorney*—Frank R. Trifari

[57] ABSTRACT

A noise-reduction scheme in a plated wire memory array contemplates the use of a nonswitchable noise-cancelling wire made of magnetically coated beryllium copper and placed coplanar and on the same center-to-center spacing as the remainder of the switchable wire array. The magnetic proximity loading effect of the noise-cancellation wire is equivalent to the effect of the magnetically coated plated wire and thus interposition of the noise cancellation wire on an equivalent geometric spacing with the array does not create a magnetic anomoly.

8 Claims, 3 Drawing Figures

Figure 1:
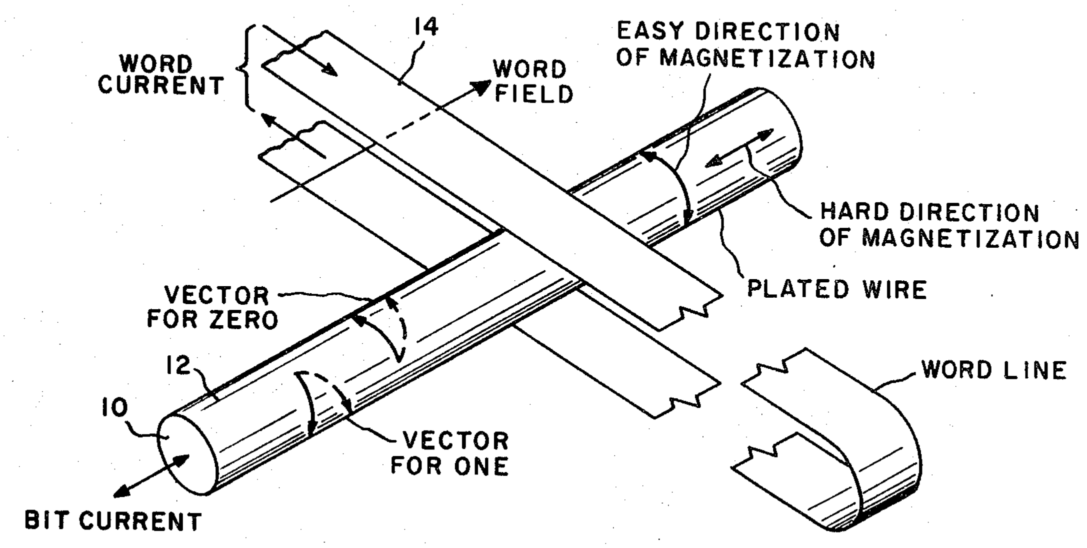

INVENTORS
R. D. FISHER
E. W. JONES
BY
AGENT

INVENTORS
R. D. FISHER
E. W. JONES
BY
AGENT

PLATED WIRE MEMORY

This invention relates to information storage devices and more particularly to magnetic storage devices employing storage elements in the shape of elongated wires plated with magnetic material.

Conventional magnetic memory devices for storing information employ toroidal cores of a magnetic material, such as ferrite, each threaded by a number of current-carrying conductors. Each core is individually addressable by means of application of coincident currents to a set of conductors intersecting at desired core location. The manufacture of such memory arrays is laborious and time consuming, involving the threading of wires through the individual core elements, the size of which can be quite diminutive. Further, readout of a core memory is destructive, the process of reading actually switching the core and thereby removing the information stored therein.

An improved form of memory device employs memory elements in the form of a plurality of elongated wire elements arranged in an array, each wire plated wire magnetic material. The memory wire in such case is by way of example a single strand of a suitable material, plated with a layer of magnetic material. The magnetic material is anisotropic material and possesses a circumferential preferred orientation, thus magnetizing more easily around the wire than along its length.

Binary data is stored in a plated wire by magnetizing the magnetic material either clockwise or counterclockwise around the wire. No longitudinal component of magnetization can be retained in the absence of an external magnetic field.

In memory operation, coincident currents through the wire and through an orthogonally positioned conductor write a one or a zero in the memory, depending on the direction of the bit current which is the current through the wire. The orthogonal conductor forms a one-turn coil around the plated wire.

To read the stored information, a word current pulse momentarily tilts the magnetization vector in the cylindrical film away from its circumferential position and the change in magnetization generates a bipolar voltage pulse in the bit wire. At the end of the current pulse, the magnetization vector returns to its original position. Hence, the process of reading out the data does not destroy the data as in a ferrite-core memory, and the data does not have to be regenerated into the memory, substantially reducing the memory cycle time and attendant electronic circuitry necessary for regeneration.

In preferred form, the memory is constructed of an array of parallel plated wires and a perpendicular array of parallel word lines each encircling all the wires once. The word lines may be conventional printed wiring. The most efficient organization is 2½ dimensional, which combines the speed and simplicity of a word-organized, or two-dimensional design with the compactness and economy of a three-dimensional design. A two-D memory would have a plated wire for each bit in a word and a word line for each word in the memory; for instance, a memory of 4,096 words of 32 bits each would have 32 plated wires and 4,096 word lines. The same memory in a 2½ D organization might have 256 plated wires and 512 word lines, each of which reads 8 words at one time. Switches would then connect the one set of 32-bit drivers or sense amplifiers to the 8-word wide memory.

The bit density (number of plated wires per unit distance) and noise patterns (spurious pulse levels during nonselect and select times) are influenced by the geometry and interaction between neighboring wires. Geometry is a function of construction.

One way of making a memory plane is to put oversize pilot wires between two sheets of two layer insulating material. Under pressure, the inner layer fuses around the wires. The sandwich is laminated to the remaining components. Freeing the pilot wires by pulling them loose leaves tunnels in the inner layer through which plated wires can be inserted. The pilot wire diameter is larger than the plated wire to facilitate ease of insertion.

Many variations of this construction are possible. Each provides a localized magnetic drive field parallel to the wire axis. Bit-storage position is where the wire and the localized drive field cross. This field is called the word drive field, because the bits of one or more wires are magnetically coupled to a drive field to form computer words. Neither the angle nor the position of the wires relative to the word drive straps is critical. The wires need only to be nominally perpendicular to the word drive straps.

To effect noise cancellation, prior art devices employ a nonmagnetic noise cancellation wire positioned in parallel with the array of plated wires. This wire is nonmagnetic so as to have no switching properties and thus provide no information although it will conduct noise inductively coupled thereto. The output of the nonmagnetic noise cancellation wire is coupled to one input of a differential amplifier while the selected plated storage wire is connected to the other input. The common direction of noise on both lines results in cancellation and the signal is thus amplified without the noise level. The plated storage wires are placed on equal centers. The nonmagnetic storage wire must be placed between a pair of plated storage wires (at half-center distance) or outside the plane of the plated storage wires but in close proximity with the storage wires so as not to disturb the center to center spacing. Each of the plated storage wires, on switching, will exhibit a loading effect on adjacent wires due to stray magnetic switching fields. The loading characteristic effects the operating range of the individual wires. Since a plurality of wires operate in response to a common switch source, a displacement of switching levels anywhere in the array will result in an overall narrowing of the operating ranges. Thus if the nonmagnetic wire were placed in the plane on the same center to center spacing as the plated storage wires, the plated storage wires adjacent to the nonmagnetic noise cancellation wires would have a different current operating range than plated wires adjacent to other plated wires, thereby creating the nonuniformity in the current-operating range in the array. The positioning of the nonmagnetic noise cancellation wire on nongeometric centers of outside the planar array is disadvantageous. Such construction is mechanically awkward and difficult to accomplish in close space, particularly where high bit densities are prescribed. Further, the proximity of the nonmagnetic noise cancellation wire to the plated storage wires can result in the unwanted coupling of spurious output signals.

It is therefore the primary object of this invention to provide noise cancellation in a plated storage wire array.

It is a further object of the invention to provide noise cancellation in a plated storage wire array without the need for mechanically awkward construction.

It is a still further object of the invention to provide noise cancellation within a plated wire array without disturbing the uniformity of the operating current range.

It is another object of the invention to provide a noise cancellation wire within a plated wire array in a manner eliminating crosstalk due to off center geometry of proximity to storage wires.

The forgoing objects are achieved with the understanding that the anomalies created by nongeometric spacing result from discontinuties due to displacement of the magnetic proximity loading effect of adjacent plated wires. It has been discovered chat utilizing a noise cancellation wire in a position normally occupied by a plated storage wire will not disturb the magnetic loading distribution if the noise cancellation wire has a magnetic loading characteristic equivalent to that of the storage wires of the array. It has been found that a dummy wire of Beryllium Copper coated with a permalloy-cobalt layer which contains an excess of cobalt will exhibit a magnetic proximity loading characteristic equivalent to that of the storage wires of the array and thus can be placed on the same center to center spacing as the storage wires of the array.

Since the dummy wire must not be switched by the word conductor, only noise is conducted along the line, and noise cancellation by means of a differential amplifier or the like can be employed as in the prior art systems. The center-to-center separation of the noise cancellation dummy wire and storage wires further precludes the crosstalk problem by providing a factor of greater physical separation relative to the center-to-center spacing than heretofore achieved. Thus greater packing densities can be realized without a sacrifice in signal to noise or crosstalk levels.

Figure 2:
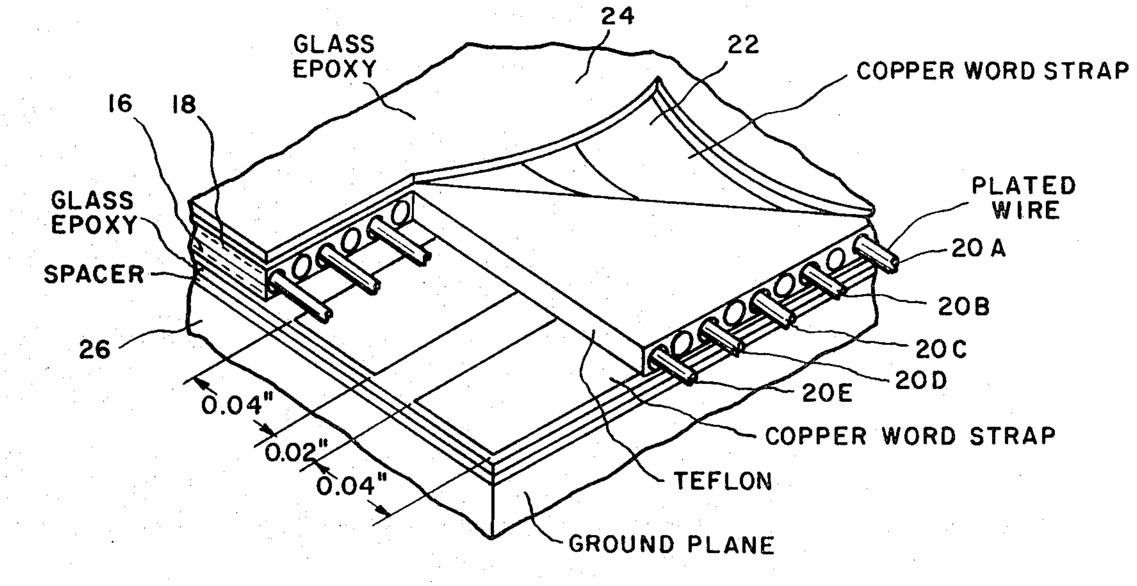
Figure 3:
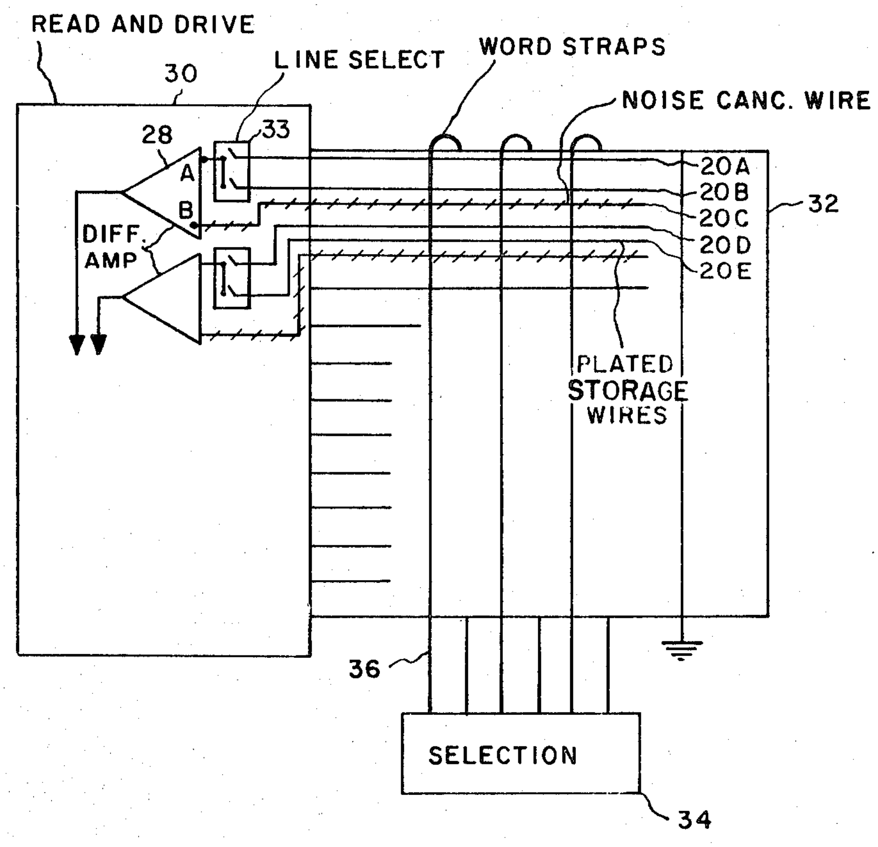

The forgoing brief description of the invention as well as other objects and advantages will become more apparent from the following detailed description wherein FIG. 1 illustrates the operation of a typical plated storage wire, FIG. 2 illustrates an array including both storage wires and noise cancellation wires in accordance with the invention and FIG. 3 in a schematic illustrating the noise cancellation electronics.

Referring to FIG. 1, the magnetic wire, used as the storage medium is, by way of example, single strand of beryllium-copper alloy 5 mils in diameter 10, plated with a 10,000-angstrom layer 12 of permalloy, a nickel-iron alloy, e.g., an alloy containing substantially 81 percent nickel—19 percent iron. The permalloy is anisotropic, and is designed during the plating process to possess a circumferential orientation, magnetizing more easily around the wire than along its length. The permalloy layer retains its anisotropy because it can contain a closed loop of flux. Binary data is stored in a plated wire by magnetizing the permalloy either clockwise or counterclockwise around the wire. No longitudinal component of magnetization can be retained in the absence of an external magnetic field.

The magnetic permalloy is deposited by known techniques on a long wire passing from a reel through a series of cleaning, etching and plating baths. The circumferential orientation is established by passing a direct current through the wire during plating. The wires are then cut and assembled in an array with a word line drive current carrying conductor 14 positioned orthogonally with respect to the plated wires for the purposes of establishing the word or drive fields for switching the desired bit position on each plated wire. In memory operation, coincident currents through the wire and through the word line drive conductor 14 write a one or a zero in the memory, depending on the direction of the current through the wire. The conductor forms a one-turn coil around the plated wire. To read the stored information, a word current pulse momentarily tilts the magnetization vector in the cylindrical film away from its circumferential position; the change in magnetization generates a bipolar voltage pulse in the bit wire 10. At the end of the current pulse, the vector returns to its original position. One mode of manufacturing a memory plane is to put pilot wires between two sheets of two layered material such a Kapton 16 coated with Teflon 18. Kapton is a plastic material with a relatively high softening point, whereas Teflon is a plastic material of relatively low softening point. Under pressure, the Teflon, having a lower softening point, fuses around the wires. The sandwich is laminated to the remaining components. Freeing the pilot wires by pulling them out leaves tunnels in the Teflon layer through which plated wires 20 A–E can be inserted. Since the diameter of the pilot wires exceeds that of the plated wire, insertion is facilitated. Word straps 22 are formed by means of etching the desired patterns on a copper layered glass epoxy base 24. A spacer mounts the wire plane to a ground plane 26.

Dimensions shown are exemplary of a typical construction. Bit storage position is where the wire and the localized drive field cross. This field is called the word drive field, because the current in one word drive line switches all the bits of one or more computer words. Neither the angle nor the position of the wires relative to the word drive straps is critical. The wires need only be nominally perpendicular to the word straps, to the extent that the drive field generated by the word strap 22 exceeds the write threshold of the plated wire but does not exceed the destructive read out level of the plated wire.

In accordance with the invention, one of the plated wires is a nonswitchable plated wire having a magnetic proximity loading characteristic substantially equivalent to the surrounding plated wires. The loading characteristic is the effect on the characteristics of a switchable plated wire resulting from the presence of adjacent plated wires, particularly in the manner wherein adjacent wires load magnetic field produced by the drive current in the word strap. As long as the plane is geometrically uniform, the adjacent wire effects will remain constant throughout the plane and no magnetic anomalies as a result of geometric discontinuties will be produced. By placing the nonswitchable wire element in the array in lieu of a storage wire location, geometric and magnetic integrity are preserved. One example of such a nonswitchable dummy wire is a 5 mil Beryllium Copper wire plated with a NiFeCo material whose characteristics are such that the wire does not switch.

An example of such material contains 67 percent Nickel (Ni), 14 percent Iron (Fe), and 19 percent Cobalt (Co). Such material will exhibit a coercive force and an anisotropy which is sufficiently high in comparison to the storage wires that it will not switch in relation to the storage wires. The intent is that the dummy or nonswitchable wire contains, as do all the plated wires of the array, a circumferentially oriented anisotropic film but with a switching threshold which is not achieved by the magnitudes of the current pulses which switch the storage wires of the array. The composition of this alloy may be varied considerably in that the cobalt may be as low as 10 percent whereas the upper limit may be of the order of 40 to 50 percent. The only criteria is that the magnitude of the switching thresholds are always greater in comparison to that of the switching thresholds of the storage wires. In fact, other magnetic materials may be utilized such as iron-cobalt alloys or even cobalt-nickel alloys. The dimension of the magnetic coating on the nonswitchable plated wire may be the same or greater than the switchable wire element in the array and may range from 8,000A. to 20,000A. The wire is said to be cobalt rich, due to the excess cobalt preventing switching.

As shown in FIG. 2, the nonswitchable noise cancellation plated wire 20C is inserted on geometrically equal centers relative to the storage wires 20A, B, D, E on a one out of *n* basis, *n* being 2, as shown, or 4, 18, 16, 32, etc., or in any desired configuration depending upon the noise cancellation pattern desired. The fact that the noise cancellation wire responds magnetically as would adjacent plated storage wire provides great flexibility in placement. The noise cancellation effect is realized electrically by termination of the noise cancellation wire 20C in an appropriate sensing unit. As shown in FIG. 3, noise cancellation lines, shown for purposes of illustration with cross hatches to distinguish same from switchable storage lines, are terminated at an input A of a differential amplifier 28 contained within a read/drive unit 30 coupled to the wire array 32. Only read amplifiers for the upper group of lines are shown but it is understood that both read and drive circuits are contained within the read/drive unit and are conventional. Each differential amplifier 28 receives at its other input B one of $n/2$ plated storage wires in accordance with logical selection of a desired line via a line select gate 33. Word selection current is provided by energization of a selection register 34 in accordance with the desired word location.

Other circuit arrangements including variation of the number of position of noise cancellation lines and the number of storage wire inputs to a single amplifier are clearly a matter of design choice.

In operation energization of a word strap 36 provides a switching field for the storage wires orthogonally positioned thereunder. The operating current ranges necessary to generate the fields required to provide this switching of the storage wires remain uniform throughout the array since the noise cancellation wires behave like plated storage wires insofar as proximity loading is concerned, as described above.

Since the noise cancellation wires are not switched, only noise is transmitted along the wires to the differential amplifier 28 terminal A. A switched condition in the permalloy film of the storage wire induces a signal in the beryllium copper substrate of the wire, which is then transmitted along with noise to the other input B, of the differential amplifier 28.

Since the nature of the differential amplifier will be to reject common mode signals, the noise appearing on both lines will be suppressed and the signal appearing on the storage wire input line will be amplified.

Other forms of plated wire systems can employ the invention aspects hereinbefore described. For example, the woven wire system employing a word line in the nature of conductor woven about the plated lines can be used instead of a word strap. Other forms of systems employing the invention aspects will be apparent to the skilled observer.

Although the invention has disclosed in terms of a particular embodiment, it will be understood that other arrangements may be devised by those skilled in the art which will be within the scope and spirit of the invention.

What is claimed is:

1. A memory array comprising a plurality of magnetic storage elements in the form of elongated wires, said wires positioned orthogonally with respect to a current carrying conductor and magnetically coupled thereto, a further wire for noise cancellation positioned in proximity with said array, said further wire occupying the same center to center spacing as the wires in said array, said further wire having an anisotropic film coated thereon which possesses a switching threshold exceeding the switching threshold of the storage wires of said array so as to be nonswitchable relative to said storage wires and having a magnetic loading characteristic equivalent to that of the wires of said array.

2. A memory array comprising a plurality of switchable magnetic storage elements in the form of a planar array of a plurality of substantially parallel elongated wires having mutually equidistant center to center spacing and plated with a film of circumferentially oriented anisotropic material, said wires positioned nominally orthogonally with respect to a current carrying conductor and magnetically coupled thereto, a further wire for noise cancellation positioned parallel to and occupying the same plane as said array and having substantially the same center to center spacing as the wires in said array, said further wire plated with a film of circumferentially oriented anisotropic material having a switching threshold exceeding the switching threshold of the storage wires of said array so as to be nonswitchable relative to said storage wires and having a magnetic proximity loading characteristic equivalent to that of the storage wires of said array.

3. The combination of claim 2 wherein said further wire is a cobalt rich permalloy coated beryllium copper wire.

4. The combination of claim 3 wherein said elongated wires are nickel-iron plated beryllium copper.

5. A memory array comprising a plurality of magnetic storage elements in the form of elongated wires plated with a first anisotropic circumferentially oriented magnetically switchable material, and occupying mutually parallel paths having mutually equidistant center-to-center spacings, each of said wires positioned orthogonally with respect to a current-carrying conductor and magnetically coupled thereto, a further wire plated with a second anisotropic material of circumferential orientation rendering the switching threshold of said further wire in excess of the storage wire and positioned coplanar with said array and occupying a path paralleling the paths of said wires in said array, said further wire being nonswitchable at the switching levels of said storage wires and having a magnetic loading characteristic equivalent to that of the wires of said array, means for energizing said current-carrying conductor for switching said switchable wires coupled thereto, a differential amplifier, means coupling at least one of said switchable wires to one input of said differential amplifiers, and means coupling said further nonswitchable wire to the other input of said differential amplifier.

6. The combination of claim 5 wherein said further wire is a cobalt rich permalloy coated beryllium copper wire.

7. The combination of claim 6 wherein said elongated wires are nickel-iron plated beryllium copper.

8. The combination of claim 5 wherein said further wire is a beryllium copper wire coated with an alloy of 67 percent Nickel, 14 percent Iron, 19 percent Cobalt.

* * * * *